UNITED STATES PATENT OFFICE.

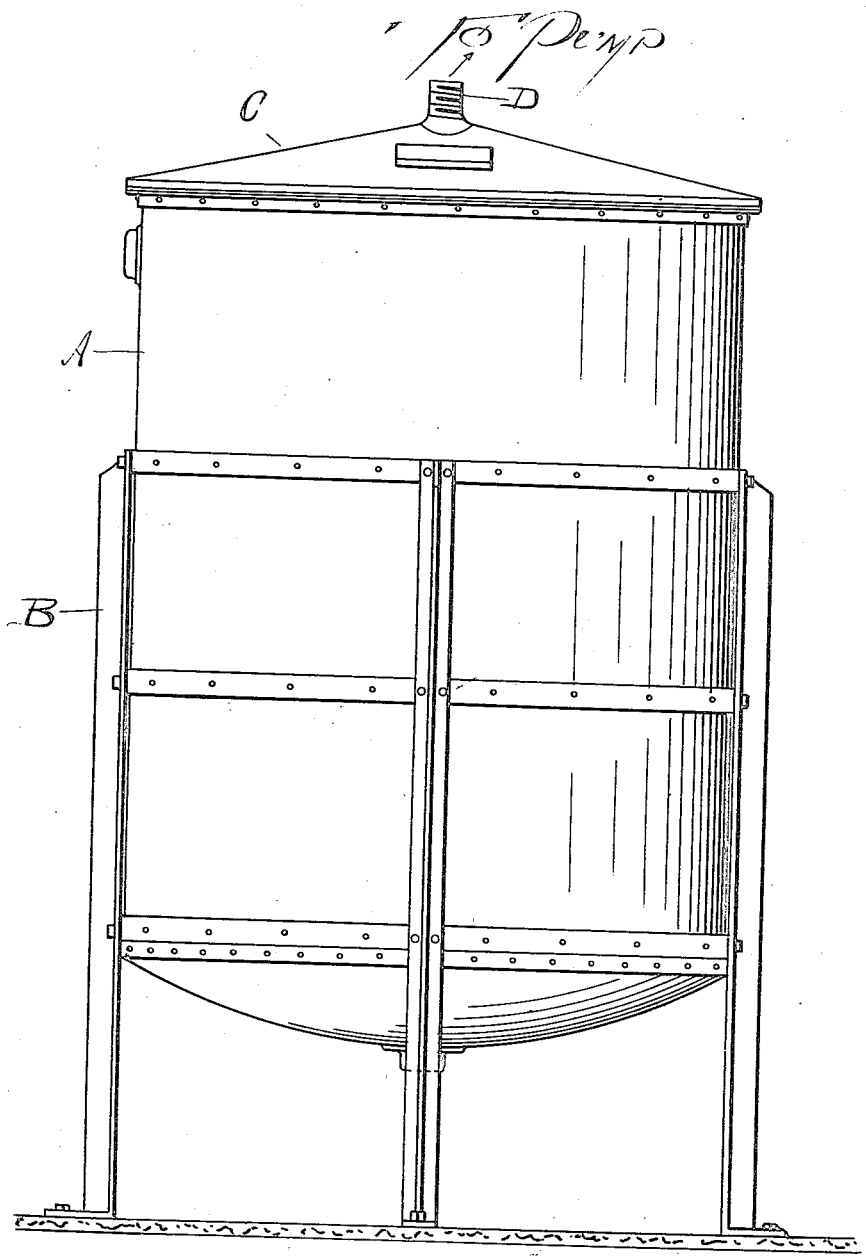

WALTER WILLIAM WILLISON, OF HASTINGS, NEW YORK, ASSIGNOR TO THERMO-KEPT PRODUCTS CORPORATION, OF NEW YORK, N. Y., A CORPORATION OF MAINE.

PROCESS OF TREATING VEGETABLES IN PREPARATION FOR CANNING.

1,421,750.　　　Specification of Letters Patent.　　Patented July 4, 1922.

Application filed August 30, 1920. Serial No. 406,932.

*To all whom it may concern:*

Be it known that I, WALTER W. WILLISON, a citizen of the United States, residing at Hastings, in the county of Westchester, State of New York, have made a certain new and useful Invention in Processes of Treating Vegetables in Preparation for Canning, of which the following is a specification.

This invention relates to a process of treating or preparing vegetables for canning, and has for its object a mode of treatment whereby certain steps of preparing vegetables for canning may be rendered more expeditious and effective for producing a superior canned article at a considerable saving in time and cost.

In the preparation or treatment of vegetables for canning it is well known that asparagus, beans, peas, spinach, and the like, require a special treatment before they may be safely canned. This treatment is known in the art as blanching, and consists in immersing the vegetables in boiling water at a proper temperature and for a proper period of time, then quickly removing said vegetables from the hot water bath and plunging them into cold water. By this mode of treatment it is intended to remove certain objectionable flavors and foreign substances; to produce a partial sterilization; to partially fix the natural color of the vegetable as treated; and in legumens and starch containing vegetables to render the same crisp and tender without rupturing the starch containing vehicles. If the vegetables are under-blanched the necessary and desirable changes to produce the best canned articles are not attained, and if over-blanched, the product may be robbed of its desired color and flavor, or it may be softened and skins broken so as to produce a muddy liquor and an undesirable article. From the above statements it is apparent that proper blanching under vastly varying conditions and with greatly differing products requires expert knowledge and infinite care. Experience has proven that even under very favorable conditions, as when vegetables are freshly picked and at the proper time, so as to be not over-ripe or immature, it is difficult for the most careful expert to always and invariably successfully blanch his product.

I have discovered a process whereby I can successfully and with invariable certainty prepare and blanch vegetables for canning without any of the annoyances and risks incident with the old blanching process of preparing green vegetables for canning. I have discovered that the hot water bath for preparing vegetables for canning may be eliminated and each batch of vegetables may be given substantially the same treatment regardless of the difference in kind and condition. By my method the germ laden mucous substance and impurities, which usually adhere to various green vegetables, are quickly and effectively removed without any danger of rupturing the skin of the vegetables treated. Furthermore, by the changes in pressure, a distinct advantage is obtained in that the vegetable cells are completely freed from air and oxygen, and thereafter thoroughly saturated with water or with the liquor in which they are immersed during the treating process.

It should further be observed that another distinct advantage arises from the use of my process in that the time of preparing certain vegetables, as the navy bean, has been materially reduced. The navy or pea bean, for example, requires a preliminary preparation before it may be blanched and must be soaked in water of proper temperature for twelve hours before being ready for blanching when the old process is used. By my process this time is reduced to thirty minutes resulting in a great saving of time and eliminating the danger of spoiling due to fermentation or to other causes.

My method consists in placing the vegetables to be prepared in a suitable tank which can be sealed air-tight and in which a vacuum may be produced by suitable pump connections. After placing the vegetables in the tank, water of proper temperature, approximately luke-warm, is added. The tank is then sealed and a vacuum is drawn. This causes the air to be removed from the cells of the vegetables as the air thus removed causes bubbles which rise to the surface, they agitate the liquid and effectively remove the muscous substances and impurities from the vegetables. As soon as most of the air bubbles have been thus removed, the vacuum is quickly and abruptly broken, and the water and containing impurities are removed. Fresh water at about the same temperature as before is added, and the above steps of again establishing a vacuum are repeated. After having subjected the vegetables to the second vacuum treatment for several minutes to insure substantially a complete removal of the air, the vacuum is again quickly broken, and the water removed. The vegetables are then ready for being packed in cans in which they are treated and sealed in the usual and well known manner.

The double vacuum treatment not only fully and safely removes the impurities and germ laden muscous substances and thus insures a complete saturation of the vegetable cells, but is believed to also have a sterilizing or deadening and exploding effect on any deleterious organisms which may be present when the vacuum is suddenly and abruptly broken. It may be that other beneficial effects result from my method of treatment, as by my method the quality of the vegetables treated and canned is greatly improved without any danger of injuring the same, and the highly specialized art of blanching is substituted by an efficient and simple method which does not require an expert to successfully prepare the vegetables for canning.

From the foregoing description it is evident that my process may be carried out with the aid of any suitable vacuum apparatus, of any suitable or desired size. And as an illustration of a form of apparatus, without however limiting myself thereby, I have shown in the accompanying drawing a vacuum tank A supported in a frame B, and provided with a bell cover C. This cover may be provided with suitable connection D for attaching a vacuum pump for rapidly exhausting the contained atmosphere to suitable degree, and for suddenly releasing said attenuation.

Having now described the objects and nature of my invention, what I claim as new and useful and of my own invention, and desire to secure by Letters Patent is,—

1. The process of preparing and blanching vegetables for canning, which consists in immersing said vegetables in a liquid, subjecting said vegetables so immersed to a vacuum, and then suddenly breaking said vacuum and removing the liquid.

2. The process of preparing and blanching vegetables for canning, which consists in immersing said vegetables in water, subjecting said vegetables so immersed to a vacuum for cleaning the same and improving their flavor, then quickly releasing said vacuum, removing the water and impurities, and thereafter repeating the herein named steps in the order given.

3. The herein described process of preparing and blanching vegetables, which consists in subjecting said vegetables to a vacuum in a liquid, thereafter suddenly breaking said vacuum and removing the liquid, then adding fresh liquid and repeating the herein named steps.

4. The herein described process of preparing and blanching vegetables, which consists in placing the vegetables in a vacuum tank, covering said vegetables with water, and then subjecting the vegetables so covered to a vacuum.

5. The herein described process of preparing and blanching vegetables, which consists in placing the vegetables in a vacuum tank, covering said vegetables with water, then subjecting the vegetables so covered to a vacuum, suddenly breaking said vacuum, removing the water and thereafter repeating the herein named steps.

6. The herein described process of preparing and blanching vegetables which consists in immersing the vegetables in warm water in a vacuum, thereby causing said water to be violently agitated to wash said vegetables and blanch the same.

7. The herein described steps of washing and blanching vegetables which consists in subjecting said vegetables to warm water under a vacuum, and then suddenly breaking said vacuum.

8. The herein described steps of washing and blanching vegetables which consists in subjecting said vegetables to warm water under a vacuum, then suddenly breaking said vacuum, removing the wash water, adding fresh water and again subjecting the vegetables and liquid to a vacuum, and thereafter breaking the vacuum and draining the water.

9. The herein described process of treating food material preparatory to canning which comprises subjecting said material to a vacuum while immersed in a liquid, and then releasing said vacuum.

In testimony whereof I have hereunto set my hand on this 19 day of August, A. D. 1920.

WALTER WILLIAM WILLISON.